US012281903B2

(12) United States Patent
Lee

(10) Patent No.: US 12,281,903 B2
(45) Date of Patent: Apr. 22, 2025

(54) VEHICLE ROUTE GUIDANCE DEVICE BASED ON PREDICTING DEVIATION FROM ROUTE

(71) Applicants: HYUNDAI MOTOR COMPANY, Seoul (KR); KIA CORPORATION, Seoul (KR)

(72) Inventor: Sang Woo Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 542 days.

(21) Appl. No.: 17/389,007

(22) Filed: Jul. 29, 2021

(65) Prior Publication Data
US 2022/0136842 A1 May 5, 2022

(30) Foreign Application Priority Data
Nov. 3, 2020 (KR) ........................ 10-2020-0145551

(51) Int. Cl.
*G01C 21/34* (2006.01)

(52) U.S. Cl.
CPC ..... *G01C 21/3415* (2013.01); *G01C 21/3461* (2013.01)

(58) Field of Classification Search
CPC ............ G01C 21/3415; G01C 21/3461; G01C 21/3492; G01C 21/3446; G01C 21/3626; B60W 50/14; B60W 2050/0005; B60W 2050/143; B60W 2552/05; G08G 1/096805; G08G 1/096833; G08G 1/096844; G08G 1/0969
See application file for complete search history.

(56) References Cited

U.S. PATENT DOCUMENTS

| 2019/0310096 A1* | 10/2019 | Yang | G01C 21/3691 |
|---|---|---|---|
| 2020/0200549 A1* | 6/2020 | Lindemann | G01C 21/3655 |
| 2023/0168095 A1* | 6/2023 | Lee | G01C 21/3415 |

FOREIGN PATENT DOCUMENTS

| CN | 110570660 A | * 12/2019 | ........... G06Q 10/047 |

OTHER PUBLICATIONS

Machine Translation CN-110570660-A (Year: 2019).*

* cited by examiner

*Primary Examiner* — Jean Paul Cass
*Assistant Examiner* — Lidia Kwiatkowska
(74) *Attorney, Agent, or Firm* — MORGAN, LEWIS & BOCKIUS LLP

(57) ABSTRACT

A vehicle route guidance device is provided. The vehicle route guidance device includes a processor configured to predict a deviation point upon route guidance and a storage configured to store data and an algorithm run by the processor. The processor is configured to calculate a deviation possible score using at least one of a first score according to a duplicated link between an old route before deviation and a route after the deviation with respect to the deviation point, a second score according to a road rating of the route before and after the deviation, or a third score according to an estimated time of arrival before and after the deviation, when route deviation occurs during the route guidance.

7 Claims, 7 Drawing Sheets

VEHICLE ROUTE GUIDANCE DEVICE BASED ON PREDICTING DEVIATION FROM ROUTE

CROSS-REFERENCE TO RELATED APPLICATION

This application claims the priority to and the benefit of Korean Patent Application No. 10-2020-0145551, filed on Nov. 3, 2020, the entire contents of which are incorporated herein by reference.

TECHNICAL FIELD

The present disclosure relates to a vehicle route guidance device, and more particularly, relates to technologies of predicting a deviation from the route during route guidance and providing guidance.

BACKGROUND

The statements in this section merely provide background information related to the present disclosure and may not constitute prior art.

In general, an apparatus for providing a route guidance service, for example, navigation, may receive a current driving location of a vehicle from a global positioning system (GPS) satellite and may display the location of the vehicle on a map while outputting the map corresponding to the driving location of the vehicle on its screen. Thus, a diver may see a driving situation of the vehicle at a glance and may be easily guided to the road the driver does not know. Recently, the driver may download an application for the route guidance service using a user device such as a smartphone and may receive the route guidance service.

A route deviation may occur during route guidance in an apparatus having such a navigation device. Such a route deviation may occur due to confusion of a user who is unfamiliar to driving, may occur due to a road characteristic such as a busy intersection, and may occur as the driver randomly selects a better route than the guided route.

There is a need for technologies of predicting a deviation when the route deviation occurs and providing guidance. However, in an existing technology, it is difficult to collect information about a deviation point and it is difficult to proceed with analyzing the deviation point because it is unable to distinguish an intentional deviation from a general deviation.

SUMMARY

An aspect of the present disclosure provides a vehicle route guidance device for calculating a deviation possible score to predict a deviation and warning of the deviation.

Another aspect of the present disclosure provides a vehicle route guidance device for adjusting a map matching period according to the number of deviations and immediately proceeding with route recalculation upon the deviation to provide route guidance.

Another aspect of the present disclosure provides a vehicle route guidance device for identifying a deviation type and providing personalized route guidance for each deviation type.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle route guidance device may include a processor that predicts a deviation point upon route guidance and a storage storing data and an algorithm run by the processor. The processor may calculate a deviation possible score using at least one of a score according to a duplicated link between an old route before a deviation and a route after the deviation with respect to the deviation point, a score according to road ratings of the routes before and after the deviation, or a score according to estimated times of arrival before and after the deviation, when the deviation from the route occurs during the route guidance.

In an embodiment, the processor may provide a deviation warning, when the deviation possible score is greater than or equal to a predetermined score.

In an embodiment, the processor may determine the deviation as an intentional deviation, as the duplicated link between the old route before the deviation and the route after the deviation is longer.

In an embodiment, the processor may subtract the sum of road ratings for each link of the route before the deviation from the sum of road ratings for each link of the route after the deviation and may calculate a value obtained by dividing the subtracted value by the sum of the road ratings for each link of the route before the deviation as the score according to the road ratings.

In an embodiment, the processor may determine that a vehicle deviates intentionally, when the sum of road ratings for each link of the route after the deviation is less than the sum of road ratings for each link of the route before the deviation.

In an embodiment, the processor may calculate the score according to the estimated times of arrival by dividing a value, obtained by subtracting an estimated time of arrival of the route before the deviation from an estimated time of arrival of the route after the deviation, by the estimated time of arrival of the route before the deviation.

In an embodiment, the processor may calculate the deviation possible score by adding all the score according to the duplicated link between the old route before the deviation and the route after the deviation among the routes, the score according to the road ratings of the routes before and after the deviation, and the score according to the estimated times of arrival before and after the deviation.

In an embodiment, the processor may assign a predetermined weight to each of the score according to the duplicated link between the old route before the deviation and the route after the deviation among the routes, the score according to the road ratings of the routes before and after the deviation, and the score according to the estimated times of arrival before and after the deviation.

According to another aspect of the present disclosure, a vehicle route guidance device may include a processor that predicts a deviation point upon route guidance and a storage storing data and an algorithm run by the processor. The processor may correct a map matching score for route recalculation depending on the number of deviations at the deviation point, when a deviation from a route occurs during the route guidance.

In an embodiment, the processor may calculate a frequency by dividing the number of deviations at the deviation point by the total number of search of the route.

In an embodiment, the processor may downwardly adjust the map matching score using an old map matching score and the frequency.

In an embodiment, the processor may immediately perform route recalculation when a deviation occurs later at the deviation point by downwardly adjusting the map matching score.

According to another aspect of the present, disclosure, a vehicle route guidance device may include a processor that predicts a deviation point upon route guidance and a storage storing data and an algorithm run by the processor. The processor may classify a deviation case for each person according to types of roads before and after a deviation with respect to the deviation point, when the deviation from a route occurs during the route guidance.

In an embodiment, the processor may assign a weight for each deviation case for each person and may guide a user along another route, upon route guidance corresponding to the deviation case for each person.

In an embodiment, the processor may more increase the weight for each deviation case for each person, as the number of deviations at the deviation point more increases.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other objects, features and advantages of the present disclosure will be more apparent from the following detailed description taken in conjunction with the accompanying drawings.

Figure 1:
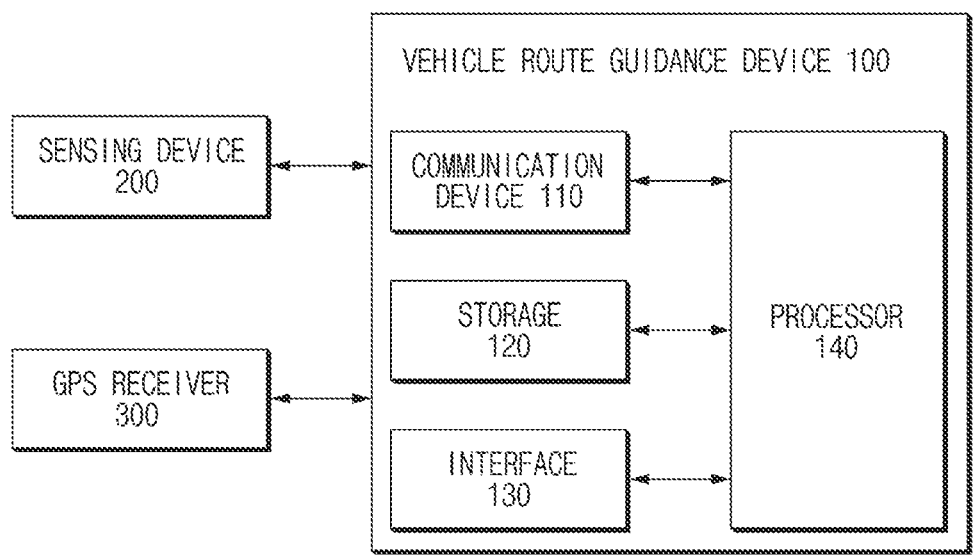
FIG. 1 is a block diagram illustrating a configuration of a vehicle system including a vehicle route guidance device in some forms of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a block diagram illustrating a configuration of a vehicle system including a vehicle route guidance device according to an embodiment of the present disclosure.

Referring to FIG. 1, the vehicle system according to an embodiment of the present disclosure may include a vehicle route guidance device 100, a sensing device 200, and a global positioning system (GPS) receiver 300.

The vehicle route guidance device 100 according to an embodiment of the present disclosure may be implemented in a vehicle. In this case, the vehicle route guidance device 100 may be integrally configured with control units in the vehicle or may be implemented as a separate device to be connected with the control units of the vehicle by a separate connection means.

The vehicle route guidance device 100 may identify and store a deviation point during route guidance, may calculate a deviation possible score using at least one of a score according to a duplicated link between an old route before a deviation and a route after the deviation among routes, a score according to road ratings of the routes before and after departure, or a score according to estimated times of arrival before and after the deviation and may provide a deviation warning when the deviation possible score is greater than or equal to a threshold. In this case, the threshold may be preset by experimental values to be stored.

The vehicle route guidance device 100 may identify and store a deviation point among routes, may correct a map matching score depending on the number of deviations at the deviation point, and may perform fast route recalculation when the deviation occurs at the deviation point later, because a map matching interval becomes short due to downward correction of the map matching score.

The vehicle route guidance device 100 may identify and store a deviation point among routes, may classify a deviation case for each person according to types of roads before and after a deviation when the deviation occurs at the deviation point, and may assign a weight based on the number of deviations per deviation case for each person to guide a user along a route with a few deviation.

To this end, the vehicle route guidance device 100 may include a communication device 110, a storage 120, an interface 130, and a processor 140.

The communication device 110 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, local interconnect network (LIN) communication, flex-ray communication, or the like.

Furthermore, the communication device 110 may communicate with a server, an infrastructure, another vehicle, or the like outside the vehicle through a wireless Internet technology or a short range communication technology. Herein, the wireless Internet technology may include wireless local area network (WLAN), wireless broadband (Wi-Bro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may perform inter-vehicle communication with the sensing device 200, the GPS receiver 300, or the like. Furthermore, the communication device 110 may receive traffic information from a traffic center or the like outside the vehicle and may receive traffic information from vehicles or infrastructures around the vehicle.

The storage 120 may store a sensing result of the sensing device 200 and data, an algorithm, and/or the like necessary for an operation of the processor 140.

As an example, the storage 120 may store map information for vehicle route guidance. The map information may include general map information or high definition map information including lane information.

Furthermore, the storage 120 may store a deviation point, a deviation route, the number of deviations, a map matching score, a deviation possible score calculated by the processor 140, a threshold for determining the deviation possible score, or the like.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable FROM (EEPROM), a magnetic RAM (MRAM), a magnetic disk, and an optical disk.

The interface 130 may include an input means for receiving a control command from a user and an output means for outputting an operation state, an operation result, or the like of the vehicle route guidance device 100. The interface 130 may be separately implemented as a head up display (HUD), a cluster, an audio video navigation (AVN), a human machine interface (HMI), a user setting menu (USM), or the like.

Herein, the input means may include a key button and may further include a mouse, a joystick, a jog shuttle, a stylus pen, or the like. Furthermore, the input means may further include a soft key implemented on a display.

The output means may include the display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other. As an example, the output means may output information about a vehicle route to a destination, a deviation warning, or the like.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected with the communication device 110, the storage 120, the interface 130, or the like and may electrically control the respective components. The processor 140 may be an electrical circuit which executes instructions of software and may perform a variety of data processing and calculation described below.

The processor 140 may process a signal delivered between the respective components of the vehicle route guidance device 100. The processor 140 may be, for example, an electronic control unit (ECU), a micro controller unit (MCU), or another sub-controller, which is loaded into the vehicle.

The processor 140 may store a deviation point in the storage 120, when a deviation occurs during route guidance, and may calculate a deviation possible score using at least one of a score according to a duplicated link between an old route before the deviation and a route after the deviation, a score according to road ratings of the routes before and after the deviation, or a score according to estimated times of arrival before and after the deviation.

Furthermore, when the deviation possible score is greater than or equal to a predetermined threshold, the processor 140 may provide a deviation warning. In this case, the threshold may be preset by experiments.

As the duplicated link between the old route before the deviation and the route after the deviation is longer, the processor 140 may determine the deviation as an intentional deviation. As the duplicated link between the old route before the deviation and the route after the deviation is shorter, the processor 140 may determine that the vehicle deviates from the old route by mistake. Thus, the processor 140 may provide a deviation warning, when the vehicle arrives at the deviation point when the vehicle is traveling later, to prevent the vehicle from deviating from the old route by mistake.

The processor 140 may calculate a score A according to the number of duplicated links between the old route and the deviation route as Equation 1 below.

$$A=100-(\text{the number of duplicated links/the number of all links}*100) \quad \text{[Equation 1]}$$

In this case, the processor 140 may determine that there is a high probability of intentional deviation, as the duplicated link between the old route after the deviation and the deviation route after the deviation is longer, that is, as the score A according to the number of duplicated links is higher, and may determine the deviation as an unintentional deviation due to poor driving or the like, as the duplicated link is shorter.

The processor 140 may subtract the sum of road ratings for each link of the route before the deviation from the sum of road ratings for each link of the route after the deviation and may calculate a value, obtained by dividing the subtracted value by the sum of the road ratings for each link of the route before the deviation, as the score according to the road ratings. Furthermore, when the sum of the road ratings for each link of the route after the deviation is less than the sum of the road ratings for each link of the route before the deviation, the processor 140 may determine that the vehicle intentionally departs from the route.

The processor 140 may calculate a score B according to a road rating (a road type) used before a merging point immediately after the deviation point as Equation 2 below.

$B$+(the sum of road ratings for each link of deviation path−the sum of road ratings for each link of old route(center route)*100/the sum of road ratings for each link of old route [Equation 2]

Figure 2:
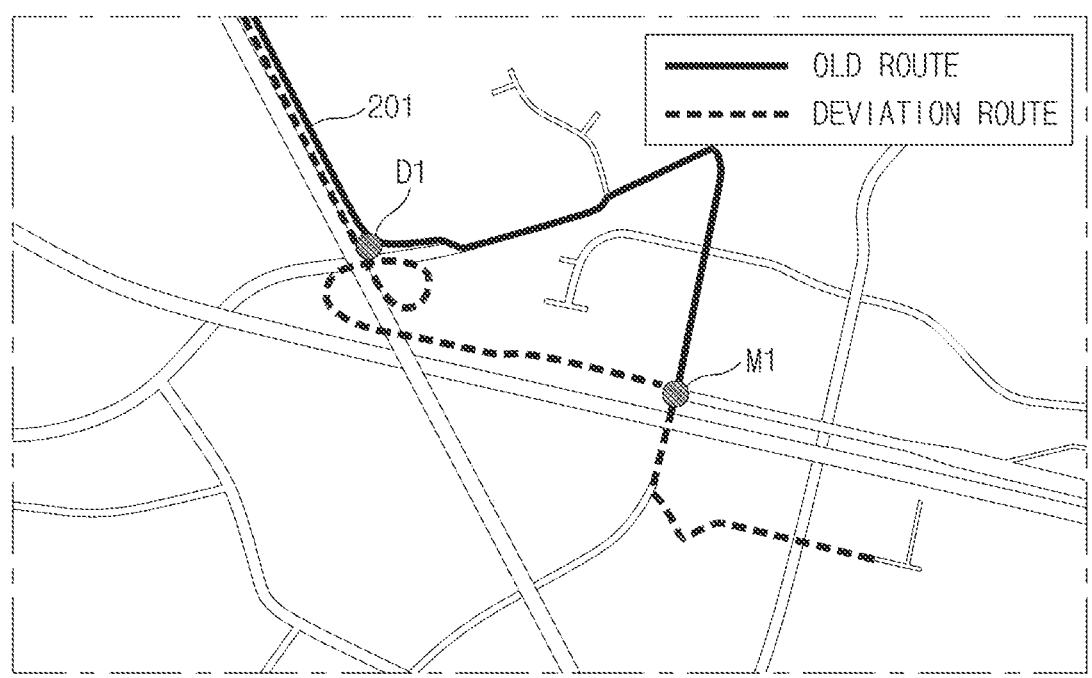
FIGS. 2 and 3 are drawings illustrating exemplary screens for calculating a deviation possible score, predicting a deviation, and providing route guidance in some forms of the present disclosure.

In FIG. 2, the processor 140 may calculate the score B according to the road type using a deviation route from a deviation point D1 to a merging point M1 and the sum of road ratings for each link of an old route 201 immediately before the deviation point D1. For example, ratings may be determined in an order of a highway, an urban expressway, a national highway, a state-funded provincial road, a provincial road, main road 1, main road 2, main road 3, other road 1, other road 2, a backside road, a ferry route, and the like. The highway may be set to the highest rating.

In this case, the processor 140 may digitize whether the vehicle intentionally deviates from the route by means of a difference in road rating. That is, the vehicle route guidance device 100 may determine that there is a high probability that the vehicle will intentionally deviate from the route as a lower road rating is used.

The processor 140 may calculate a score C according to an estimated time of arrival (ETA) as Equation 3 below.

$C$=(ETA after deviation−old ETA)*100/ETA immediately before deviation [Equation 3]

The processor 140 may calculate the score according to the ETA by dividing a value, obtained by subtracting an ETA of the route before the deviation from an ETA of the route after the deviation, by the ETA of the route before the deviation.

The processor 140 may determine that there is a high probability that the vehicle will deviate from the route because of the driver's mistake, as the ETA after the deviation more increases, that is, as the score C according to the ETA more increases. Thus, the vehicle route guidance device 100 may calculate the deviation possible score by adding all the score A according to the number of the duplicated links, the score B according to the road ratings, and the score C according to the ETA.

Furthermore, the processor 140 may set a weight for each of the score A according to the number of the duplicated links, the score B according to the road ratings, and the score C according to the ETA and may multiply the weight by each score to calculate the deviation possible score. In this case, the weight may be preset by experimental values or may be preset by selection of the user.

As such, the processor 140 may assign a predetermined weight to each of the score according to the duplicated link between the old route before the deviation and the route after the deviation among the routes, the score according to the road ratings of the routes before and after the deviation, and the score according to the estimated times of arrival before and after the deviation.

The processor 140 may calculate the deviation possible score by adding all the score according to the duplicated link between the old route before the deviation and the route after the deviation among the routes, the score according to the road ratings of the routes before and after the deviation, and the score according to the estimated times of arrival before and after the deviation.

Figure 3:
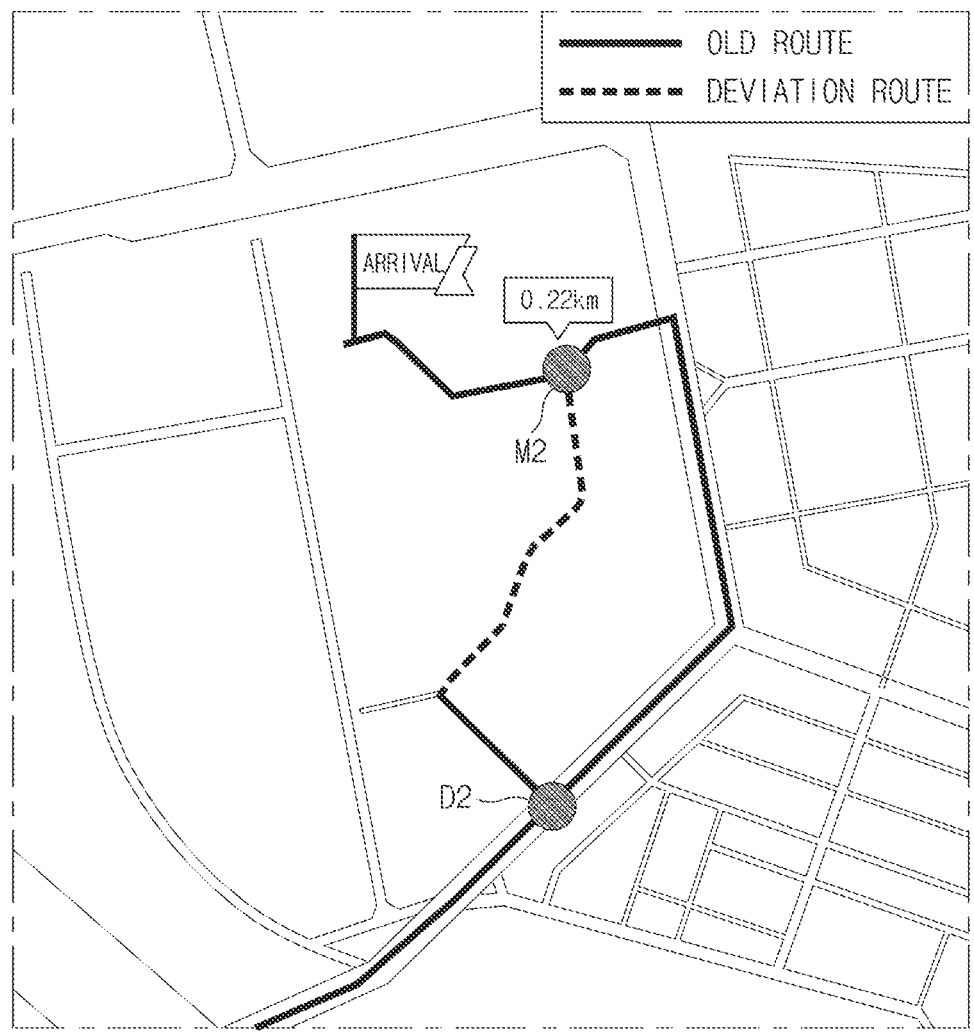

FIGS. 2 and 3 are drawings illustrating exemplary screens for calculating a deviation possible score, predicting a deviation, and providing route guidance according to an embodiment of the present disclosure.

As shown in FIG. 2, when there are an old route and a deviation route, for example, when the number of duplicated links between the old route and the deviation route is 325 and when the number of all links is 387, a score A according to the number of the duplicated links is 100−(325/387)*100, that is, 16.02.

Furthermore, when the sum of road ratings for each link of the deviation route is 1564 and when the sum of road ratings for each link of a route (a center route) immediately before the deviation is 1342, a score B according to the road ratings is (1564−1342)*100/1342, that is, 16.54.

When an ETA after the deviation is 42 minutes and when an old ETA is 35 minutes, a score C according to the ETA is 20 because of (42 minutes after deviation−initial 35 minutes)*100/35.

Thus, when a weight of the score A according to the number of the duplicated links is set to 0.3, when a weight of the score B according to the road ratings is set to 0.2, and when a weight of the score C according to the ETA is set to 0.5, the deviation possible score is {(16.02)*0.3}+{(16.54)*0.2}+{20*0.5}, that is, 4.81+3.31+10, and is 18.12 finally.

Referring to FIG. 3, because a score according to the number of duplicated links from a deviation point D2 to a merging point M2 is 100−(the number of duplicated links/the number of search links immediately before deviation)*100, as it is 100−(199/208)*100, the deviation possible score is 4.33.

Because the score according to the road ratings is (the sum of road ratings of the deviation route−the sum of road ratings of the center route (old route))*100/the sum of the road ratings of the center route, as it is (901−995)*100/995, the deviation possible score is −9.45.

As a score according to a difference in ETA is (29 minutes after deviation−initial 32 minutes)*100/32, it is −9.38.

Thus, a weight for preventing deviation is that {(4.33)*0.3}+{(−9.45)*0.2}+{−9.38*0.5}=1.30−1.89−4.69=−5.28=0. In this case, because it is impossible for the weight to be a negative number, when the weight is the negative number, it may be replaced with "0".

The processor 140 may predict a deviation point upon route guidance and may correct a map matching score, like Equation 4 below, depending on the number of deviations at the deviation point.

i) Frequency=(the number of deviations/the total number of search using a corresponding interval)*100 ii) Correction=old map matching score*{(100−frequency)/100} [Equation 4]

The processor 140 may calculate a frequency by dividing the number of deviations at the deviation point by the total number of search of the route. The processor 140 may downwardly adjust a map matching score using the old map matching score and the frequency. Thus, the processor 140 may immediately perform route recalculation when a deviation occurs later at the deviation point by downwardly adjusting the map matching score.

Map matching is a method for obtaining a current location of the vehicle applied to a navigation mode, which may be to obtain the current location while comparing the current location calculated by sensor data with data of a map and correct the current location or the vehicle to be indicated on the map in an area included in a detailed map.

The lower the map matching score, the shorter the period for obtaining the current location while comparing the current location calculated by the sensor data with the data of the map. Thus, the vehicle route guidance device 100 may lower a map matching score, when the vehicle passes through a point with the highest deviation frequency, may immediately proceed with deviation search, when the deviation occurs, to quickly respond to route deviation.

Figure 4:
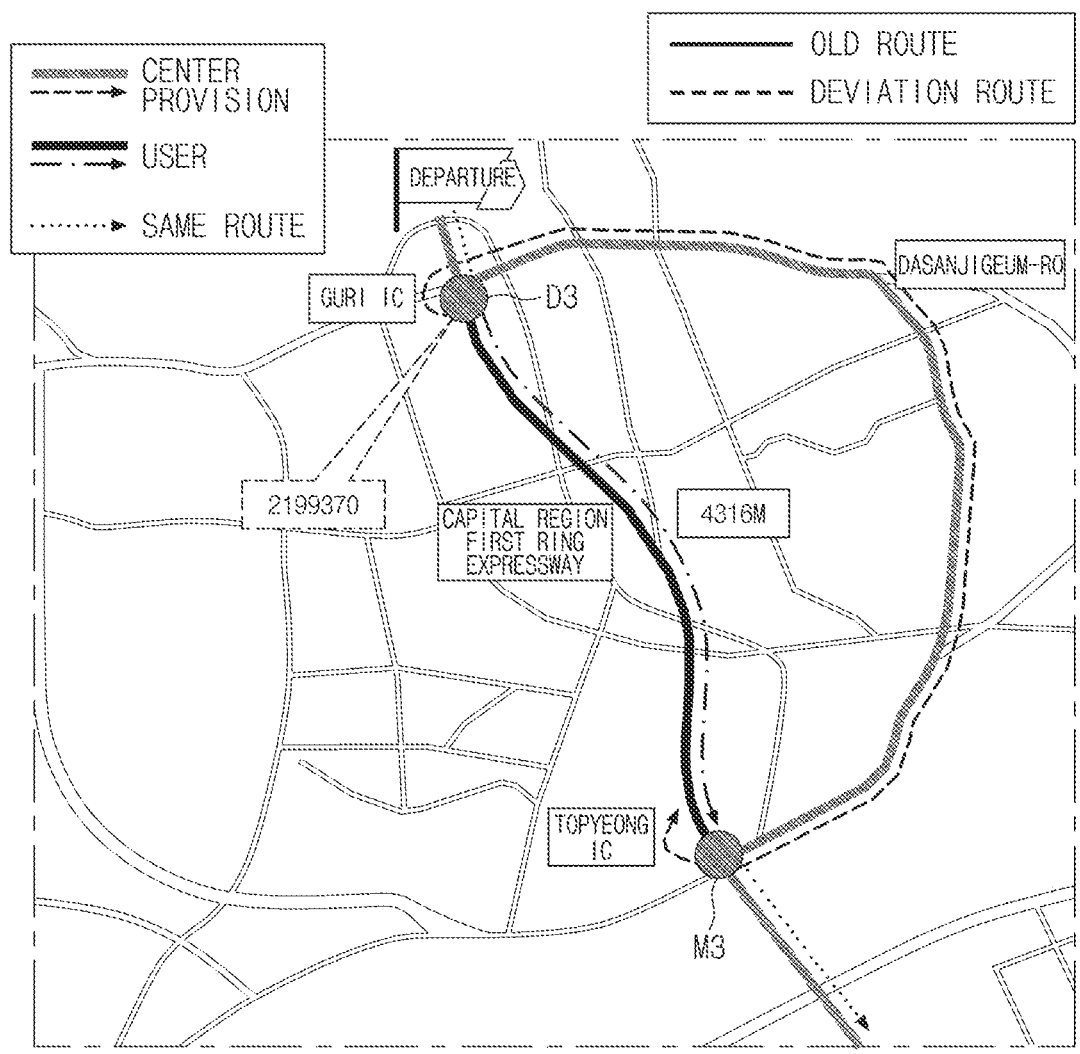
FIG. 4 is a drawing illustrating an exemplary screen for describing an example of adjusting a map matching period according to the number of deviations and an example of identifying a deviation type and providing personalized route guidance for each deviation type in some forms of the present disclosure.

FIG. 4 is a drawing illustrating an exemplary screen for describing an example of adjusting a map matching period according to the number of deviations and an example of identifying a deviation type and providing personalized route guidance for each deviation type according to an embodiment of the present disclosure.

For example, as shown in FIG. 4, when the number of deviations at a deviation point D3 is 118 for 6 months, because a frequency is (the number of deviations/the total number of search where a corresponding section is used) *100, (118/2569)*100=4.59.

Thus, because the map matching score is an old map matching score (e.g., 59)*{(100−frequency)/100}, as it is that 59*(0.95)=56.2919, it is lower than an existing map matching score.

When a deviation occurs at a deviation point, the processor 140 may classify a deviation case for each person according to types of roads before and after the deviation.

The deviation case is Table 1 below.

TABLE 1

| Classification | Before deviation | After deviation |
| --- | --- | --- |
| 1 | Highway-General road-Highway | Highway-Highway-Highway |
| 2 | Backside road-General road-Backside road | Backside road-General road-General road |
| 3 | Right turn-Left turn-Left turn-Right turn (C-shaped route) | Drive straight |
| 4 | Highway-Another highway | Same highway |

Upon route guidance corresponding to the deviation case for each person, the processor 140 may assign a weight for each deviation case for each person to guide the user along another route. In other words, in case of highway-general road-highway, which is case 1, and when the number of deviations is above 10 times, the processor 140 may generate a driving route composed of the highway and may guide the user along the driving route.

Furthermore, as the number of deviations at the deviation point more increases, the processor 140 may more increase a weight for each deviation case for each person.

A sensing device 200 of FIG. 1 may include one or more sensors, each of which measures an obstacle located around the vehicle, a distance from the obstacle, and/or a relative speed of the obstacle.

The sensing device 200 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

A GPS receiver 300 of FIG. 1 may receive a GPS signal and may provide the vehicle route guidance device 100 with the received GPS signal. Thus, the vehicle route guidance device 100 may identify a location of the vehicle.

Figure 5:
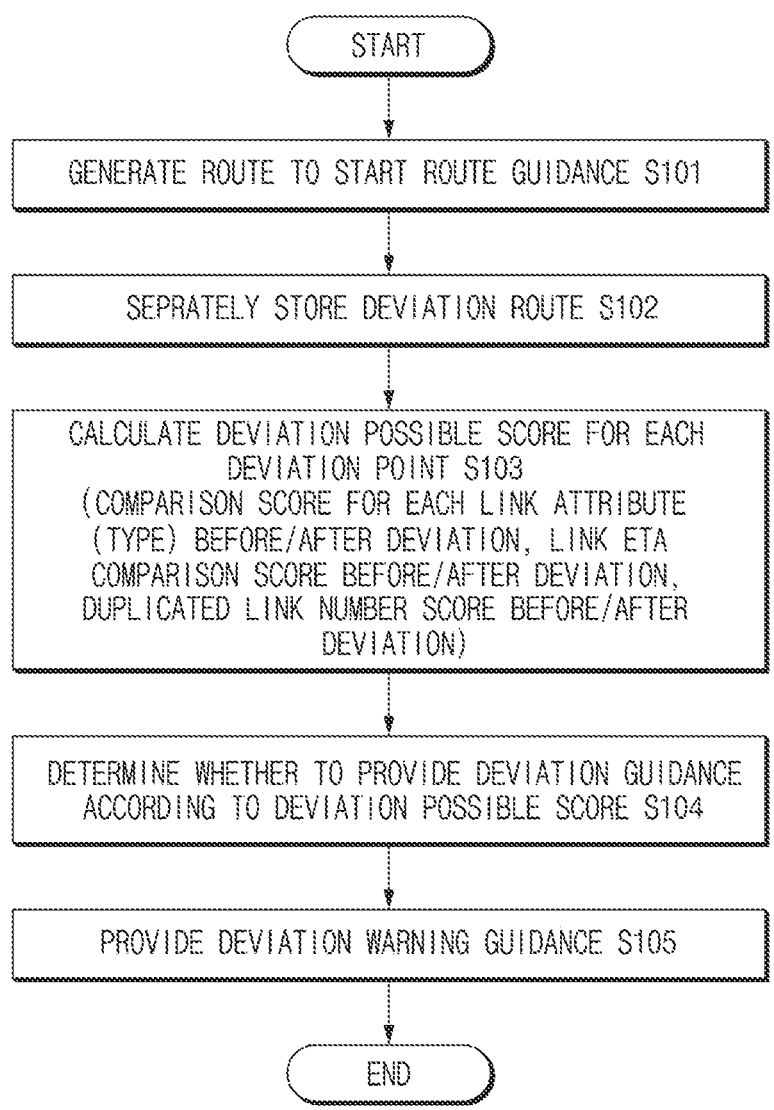
FIG. 5 is a flowchart illustrating a vehicle route guidance method in some forms of the present disclosure.

FIG. 5 is a flowchart illustrating a vehicle route guidance method according to an embodiment of the present disclosure. Referring to FIG. 5, in S101, a vehicle route guidance device 100 may generate a route to a destination to start route guidance.

When the vehicle deviates from the guided route while traveling, in S102, the vehicle route guidance device 100 may store a deviation point.

In S103, the vehicle route guidance device 100 may calculate a deviation possible score for each deviation point. In this case, the deviation possible score for each deviation point may include a comparison score for each link attribute (for each link type) before/after the deviation, a link ETA comparison score before/after the deviation, a duplicated link number score before/after the deviation, or the like.

In S104, the vehicle route guidance device 100 may determine whether the deviation possible score is greater than or equal to a predetermined reference value to determine whether to provide deviation guidance. When the deviation possible score is greater than or equal to the predetermined reference value, in S105, the vehicle route guidance device 100 may provide deviation warning guidance.

As such, an embodiment of the present disclosure may predict a possibility of deviation to provide a warning, thus preventing the vehicle from deviating by mistake without intentionality to increase reliability of the system.

Figure 6:
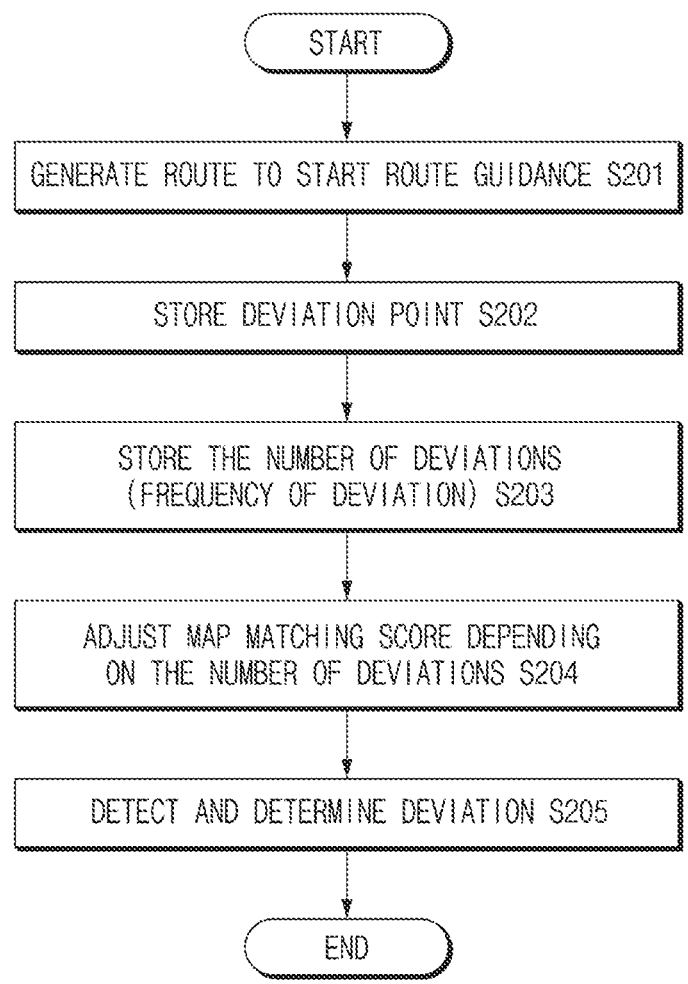
FIG. 6 is a flowchart illustrating a vehicle route guidance method in some forms of the present disclosure.

Hereinafter, a description will be given in detail of a vehicle route guidance method according to another embodiment of the present disclosure with reference to FIG. 6. FIG. 6 is a flowchart illustrating a vehicle route guidance method according to another embodiment of the present disclosure. In FIG. 6, an example of adjusting a map matching period according to the number of deviations at a deviation point and immediately proceeding with route recalculation upon deviation to provide route guidance is disclosure.

Hereinafter, it is assumed that a vehicle route guidance device 100 of FIG. 1 performs a process of FIG. 6. Furthermore, in a description of FIG. 6, an operation described as being performed by an apparatus may be understood as being controlled by a processor 140 of the vehicle route guidance device 100.

Referring to FIG. 6, in S201, the apparatus may generate a route to a destination to start route guidance.

When the vehicle deviates from the guided route while traveling, in S202, the apparatus may store a deviation point.

In S203, the apparatus may store the number of deviations (a frequency of deviation). For example, whenever the vehicle deviates at the same deviation point, the apparatus may increase the number of deviations by "1" to store the increased number of deviations.

In S204, the apparatus may adjust a map matching score depending on the number of deviations. In this case, as the number of deviations more increases, the apparatus may determine that a probability of deviation is higher.

In other words, in S205, the apparatus may more decrease a map matching score as the number of deviations more increases to immediately determine a deviation and proceed with route recalculation, when the deviation occurs.

In S205, the apparatus may detect the deviation point and may determine whether the vehicle deviates at the deviation point based on the number of deviations.

As such, the apparatus according to another embodiment of the present embodiment may adjust the map matching score depending on the number of deviations and may more quickly detect the deviation when the vehicle deviates later to perform fast route recalculation.

Figure 7:
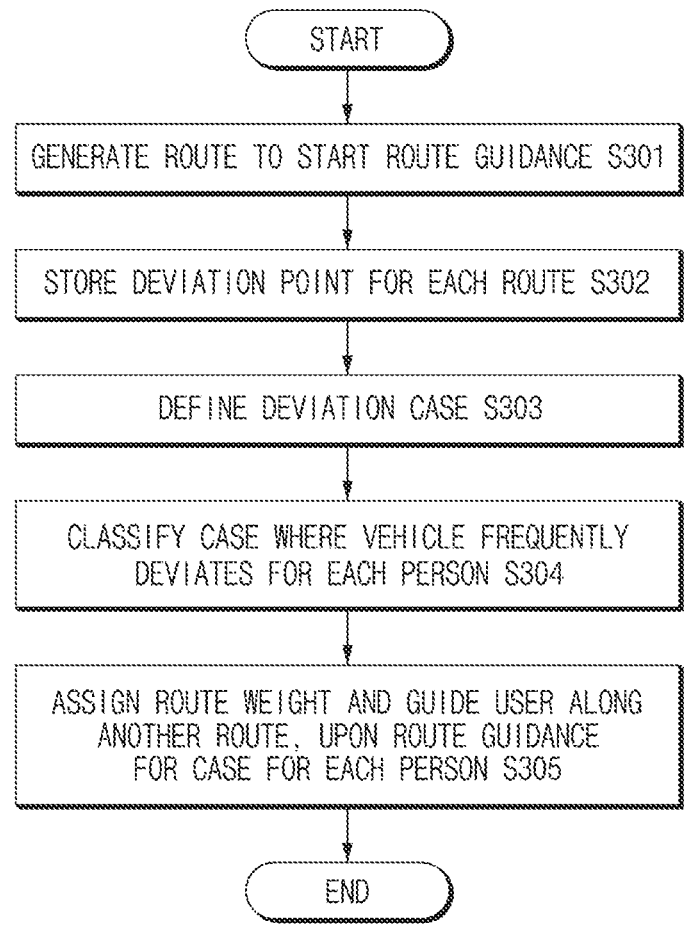
FIG. 7 is a flowchart illustrating a vehicle route guidance method in some forms of the present disclosure.

Hereinafter, a description will be given in detail of a vehicle route guidance method according to another embodiment of the present disclosure with reference to FIG. 7. FIG. 7 is a flowchart illustrating a vehicle route guidance method according to another embodiment of the present disclosure. In FIG. 7, an example of identifying a deviation type at a deviation point and providing personalized route guidance for each deviation type is disclosed.

Hereinafter, it is assumed that a vehicle route guidance device 100 of FIG. 1 performs a process of FIG. 7. Furthermore, in a description of FIG. 7, an operation described as being performed by an apparatus may be understood as being controlled by a processor 140 of the vehicle route guidance device 100.

Referring to FIG. 7, in S301, the apparatus may generate a route to a destination to start route guidance.

When the vehicle deviates from the guided route while traveling, in S302, the apparatus may store a deviation point for each route.

In S303, the apparatus may define a deviation case.

In S304, the apparatus may classify a case where the vehicle frequently deviates for each person. In S305, the apparatus may assign a route weight and may guide a user along another route, upon route guidance for the case for each person.

When the route is case 1 (highway-general road-highway), vehicle A frequently uses a deviation route where the vehicle deviates and uses only the highway. Thus, the apparatus may increase a weight for the case when a deviation occurs for the first time once and may not guide the user along case 1 (highway-general road-highway) as a route when it is similar.

Furthermore, the apparatus may operate a weight for preventing case 1 when currently searching for a center route and may increase the weight, whenever the vehicle deviates, for the user of the vehicle.

Thus, the current weight at the deviation point is an old weight+(the number of deviations). When the old weight is 300, 300+10 (times)=310.

Herein, because it is able for excessive weight assignment to rather provide an abnormal route, the apparatus may not assign two times or more of the old weight. Furthermore, the apparatus may initialize a weight for each case for each person, if desired by the user.

As such, the apparatus according to another embodiment of the present disclosure may define a case for each deviation, may classify a corresponding deviation case for each person, and may assign a weight to the case when searching for a route later to guide the user along another route.

Thus, an embodiment of the present disclosure may improve route guidance quality by collecting and analyzing the deviation point, may perform fast route recalculation by performing early deviation determination for a portion where a deviation occurs frequently, and may generate a customized route through path planning with respect to a deviation case for each person.

Thus, the operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The present technology may improve route guidance quality by collecting and analyzing a deviation point, may perform quick route recalculation by performing early deviation determination for a portion where the deviation occurs frequently, and may generate a customized route through route planning with regard to a deviation case for each person.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle route guidance device, comprising:
a processor configured to predict a deviation point upon route guidance;
a storage configured to store data and an algorithm run by the processor; and
an output device electrically connected to the processor, wherein the processor is further configured to:
calculate a deviation possible score using a first score according to a duplicated link between an old route before a deviation and a route after the deviation with respect to the deviation point, a second score according to road ratings of the routes before and after the deviation, and a third score according to estimated times of arrival before and after the deviation when the deviation from the route occurs during the route guidance, and
wherein the processor is further configured:
to assign a predetermined weight to each of the first score, the second score, and the third score;
to generate a deviation warning based on the deviation possible score; and
to output the old route, a deviation route and the generated deviation warning via the output device visually or audibly.

2. The vehicle route guidance device of claim 1, wherein the processor is further configured to:
output the deviation warning when the deviation possible score is greater than or equal to a predetermined score.

3. The vehicle route guidance device of claim 1, wherein the processor is further configured to:
   determine that the deviation is an intentional deviation when the duplicated link after the deviation is longer than a predetermined link.

4. The vehicle route guidance device of claim 1, wherein the processor is further configured to:
   subtract a sum of road ratings for each link of the route before the deviation from a sum of road ratings for each link of the route after the deviation; and
   calculate a value obtained by dividing the subtracted value by the sum of the road ratings for each link of the route before the deviation as the score according to the road ratings.

5. The vehicle route guidance device of claim 1, wherein the processor is further configured to:
   determine that a vehicle deviates intentionally when a sum of road ratings for each link of the route after the deviation is less than a sum of road ratings for each link of the route before the deviation.

6. The vehicle route guidance device of claim 1, wherein the processor is further configured to:
   calculate the score according to the estimated times of arrival by dividing a value that is obtained by subtracting an estimated time of arrival of the route before the deviation from an estimated time of arrival of the route after the deviation by the estimated time of arrival of the route before the deviation.

7. The vehicle route guidance device of claim 1, wherein the processor is further configured to:
   calculate the deviation possible score by adding the first score, the second score, and the third score.

* * * * *